United States Patent
Unger

(10) Patent No.: US 10,889,961 B2
(45) Date of Patent: Jan. 12, 2021

(54) AUTOMATIC WALKING FOR A LOAD TRANSPORTING APPARATUS

(71) Applicant: Entro Industries, Inc., Hillsboro, OR (US)

(72) Inventor: Brian Unger, Hillsboro, OR (US)

(73) Assignee: ENTRO INDUSTRIES, INC., Hillsboro, OR (US)

( * ) Notice: Subject to any disclaimer, the term of this patent is extended or adjusted under 35 U.S.C. 154(b) by 293 days.

(21) Appl. No.: 15/896,846

(22) Filed: Feb. 14, 2018

(65) Prior Publication Data

US 2019/0048558 A1 Feb. 14, 2019

Related U.S. Application Data

(63) Continuation-in-part of application No. 15/807,176, filed on Nov. 8, 2017.

(Continued)

(51) Int. Cl.
*B66F 11/04* (2006.01)
*E02F 9/04* (2006.01)
(Continued)

(52) U.S. Cl.
CPC .............. *E02F 9/04* (2013.01); *B62D 57/022* (2013.01); *B62D 57/032* (2013.01); *B66F 3/46* (2013.01);
(Continued)

(58) Field of Classification Search
CPC ...... B66F 1/00; B66F 3/00; B66F 5/00; B66F 7/00
See application file for complete search history.

(56) References Cited

U.S. PATENT DOCUMENTS 1,001,299 A 8/1911 Page
1,242,635 A 10/1917 Anderson
(Continued)

FOREIGN PATENT DOCUMENTS

CA 2871406 11/2014
CA 2798743 8/2015
(Continued)

OTHER PUBLICATIONS

Schwabe Williamson & Wyatt, PC "Listing of Related Cases", Feb. 14, 2018; 2 Pages.
(Continued)

*Primary Examiner* — Lee D Wilson
(74) *Attorney, Agent, or Firm* — Schwabe Williamson & Wyatt

(57) ABSTRACT

A control system retracts lifting devices to a stored reset height during a reset operation to raise support feet off of a base surface. The control device raises a load to a stored moving height above the base surface during a moving operation. The control system automatically repeats the reset and moving operations using the stored reset and stored moving heights. The control device may receive an adjustment signal identifying a new height of the support feet or load bearing frame above the base surface and uses the new height during subsequent reset or moving operations. The control device may default to a minimum reset height or a minimum moving height when the new height would cause the support feet or load bearing frame to drag on the base surface.

12 Claims, 9 Drawing Sheets

Related U.S. Application Data

(60) Provisional application No. 62/542,641, filed on Aug. 8, 2017.

(51) Int. Cl.

| | | |
|---|---|---|
| *B62D 57/032* | (2006.01) | |
| *B66F 3/46* | (2006.01) | |
| *B66F 7/20* | (2006.01) | |
| *B62D 57/02* | (2006.01) | |
| *E02B 17/08* | (2006.01) | |

(52) U.S. Cl.
CPC ............ *B66F 7/20* (2013.01); *E02B 17/0809* (2013.01); *E02B 17/08* (2013.01)

(56) References Cited

U.S. PATENT DOCUMENTS

| | | |
|---|---|---|
| 1,289,207 A | 12/1918 | Leach |
| 1,429,551 A | 9/1922 | Anderson |
| 1,615,055 A | 1/1927 | Turner |
| 1,627,249 A | 5/1927 | Page |
| 1,692,121 A | 11/1928 | Grant |
| 1,879,446 A | 2/1931 | Page |
| 1,914,692 A | 6/1933 | Kakaska |
| 1,915,134 A | 6/1933 | MacPherson |
| 2,132,184 A | 10/1937 | Poche |
| 2,164,120 A | 6/1939 | Page |
| 2,247,782 A | 7/1941 | Martinson |
| 2,259,200 A | 10/1941 | Cameron et al. |
| 2,290,118 A | 7/1942 | Page |
| 2,380,431 A | 7/1945 | Harding |
| 2,399,375 A | 4/1946 | Mullins |
| 2,452,632 A | 11/1948 | McLeod |
| 2,541,496 A | 2/1951 | Busick, Jr. |
| 2,616,677 A | 11/1952 | Compton |
| 2,644,691 A | 7/1953 | Pohle |
| 2,660,253 A | 11/1953 | Davidson |
| 2,660,449 A | 11/1953 | MacPherson |
| 2,692,770 A | 10/1954 | Nallinger et al. |
| 2,914,127 A | 8/1955 | Ricouard |
| 2,777,528 A | 1/1957 | Jourdain |
| 2,942,676 A | 12/1957 | Kraus |
| 2,901,240 A | 8/1959 | Fikse |
| 2,935,309 A | 5/1960 | McCarthy |
| 3,078,941 A | 2/1963 | Baron |
| 3,113,661 A | 12/1963 | Linke et al. |
| 3,135,345 A | 6/1964 | Scruggs |
| 3,150,733 A | 9/1964 | Goebel |
| 3,249,168 A | 5/1966 | Klein |
| 3,255,836 A | 6/1966 | Hoppmann et al. |
| 3,265,145 A | 8/1966 | Beitzel |
| 3,334,849 A | 8/1967 | Bronder |
| 3,362,553 A | 1/1968 | Weinmann |
| 3,375,892 A | 4/1968 | Kraschnewski et al. |
| 3,446,301 A | 5/1969 | Thomas |
| 3,448,994 A | 6/1969 | King et al. |
| 3,490,786 A | 1/1970 | Ravenel |
| 3,493,064 A | 2/1970 | Wilson |
| 3,512,597 A | 5/1970 | Baron |
| 3,527,313 A | 9/1970 | Reimann |
| 3,528,341 A | 9/1970 | Rieschel |
| 3,576,225 A | 4/1971 | Chambers |
| 3,595,322 A | 7/1971 | Reimann |
| 3,612,201 A | 10/1971 | Smith |
| 3,638,747 A | 2/1972 | Althoff |
| 3,674,103 A | 7/1972 | Kiekhaefer |
| 3,734,220 A | 5/1973 | Smith |
| 3,754,361 A | 8/1973 | Branham |
| 3,765,499 A | 10/1973 | Harmala |
| 3,767,064 A | 10/1973 | Lutz |
| 3,767,224 A | 10/1973 | Schneeweiss |
| 3,796,276 A | 3/1974 | Maeda |
| 3,807,519 A | 4/1974 | Patch |
| 3,853,196 A | 12/1974 | Guest |
| 3,866,425 A | 2/1975 | Morrice |
| 3,866,835 A | 2/1975 | Dowd |
| 3,921,739 A | 11/1975 | Rich et al. |
| 3,951,225 A | 4/1976 | Schewenk |
| 4,014,399 A | 3/1977 | Ruder |
| 4,021,978 A | 5/1977 | Busse |
| 4,048,936 A | 9/1977 | Uchizono |
| RE29,541 E | 2/1978 | Russell |
| 4,135,340 A | 1/1979 | Cox |
| 4,206,935 A | 6/1980 | Sheppard et al. |
| 4,252,204 A | 2/1981 | Bishop |
| 4,290,495 A | 9/1981 | Elliston |
| 4,296,820 A | 10/1981 | Loftis |
| 4,324,077 A | 4/1982 | Woolslayer |
| 4,324,302 A | 4/1982 | Rabinovitch |
| 4,334,587 A | 6/1982 | Rangaswamy |
| 4,371,041 A | 2/1983 | Becker |
| 4,375,892 A | 3/1983 | Jenkins |
| 4,405,019 A | 9/1983 | Frisbee |
| 4,406,339 A | 9/1983 | Spencer |
| 4,423,560 A | 1/1984 | Rivinius |
| 4,489,954 A | 12/1984 | Yasui et al. |
| 4,491,449 A | 1/1985 | Hawkins |
| 4,555,032 A | 11/1985 | Mick |
| 4,655,467 A | 4/1987 | Kitzmiller et al. |
| 4,759,414 A | 7/1988 | Willis |
| 4,821,816 A | 4/1989 | Willis |
| 4,823,870 A | 4/1989 | Sorokan |
| 4,831,795 A | 5/1989 | Sorokan |
| 4,842,298 A | 6/1989 | Jarvis |
| 5,015,147 A | 5/1991 | Taylor |
| 5,178,406 A | 1/1993 | Reynolds |
| 5,245,882 A | 9/1993 | Kallenberger |
| 5,248,005 A | 9/1993 | Mochizuki |
| 5,398,396 A | 3/1995 | Sanders |
| 5,492,436 A | 2/1996 | Suksumake |
| 5,575,346 A | 11/1996 | Yberle |
| 5,600,905 A | 2/1997 | Kallenberger |
| 5,603,174 A | 2/1997 | Kallenberger |
| 5,613,444 A | 3/1997 | Ahmadian et al. |
| 5,749,596 A | 5/1998 | Jensen et al. |
| 5,794,723 A | 8/1998 | Caneer |
| 5,921,336 A | 7/1999 | Reed |
| 6,089,583 A | 7/2000 | Taipale |
| 6,202,774 B1 | 3/2001 | Claassen et al. |
| 6,203,247 B1 | 3/2001 | Schellstede |
| 6,345,831 B1 | 2/2002 | deMarcellus |
| 6,474,926 B2 | 11/2002 | Weiss |
| 6,554,145 B1 | 4/2003 | Fantuzzi |
| 6,554,305 B2 | 4/2003 | Fulks |
| 6,581,525 B2 | 6/2003 | Smith |
| 6,612,781 B1 | 9/2003 | Jackson |
| 6,651,991 B2 | 11/2003 | Carlstedt et al. |
| 6,820,887 B1 | 11/2004 | Riggle |
| 6,857,483 B1 | 2/2005 | Dirks |
| 6,962,030 B2 | 11/2005 | Conn |
| 7,182,163 B1 | 2/2007 | Gipson |
| 7,308,953 B2 | 12/2007 | Barnes |
| 7,357,616 B2 | 4/2008 | Andrews |
| 7,681,674 B1 | 3/2010 | Barnes et al. |
| 7,806,207 B1 | 10/2010 | Barnes et al. |
| 7,819,209 B1 | 10/2010 | Bezner |
| 7,882,915 B1 | 2/2011 | Wishart |
| 8,019,472 B2 | 9/2011 | Montero |
| 8,051,930 B1 | 11/2011 | Barnes et al. |
| 8,250,816 B2 | 8/2012 | Donnally |
| 8,468,753 B2 | 6/2013 | Donnally |
| 8,490,724 B2 | 7/2013 | Smith et al. |
| 8,490,727 B2 | 7/2013 | Smith et al. |
| 8,544,853 B2 | 10/2013 | Kanaoka |
| 8,556,003 B2 | 10/2013 | Souchek |
| 8,561,733 B2 | 10/2013 | Smith et al. |
| 8,573,334 B2 | 11/2013 | Smith |
| 8,646,549 B2 | 2/2014 | Ledbetter |
| 8,646,976 B2 | 2/2014 | Stoik |
| 8,839,892 B2 | 9/2014 | Smith et al. |
| 8,887,800 B2 | 11/2014 | Havinga |
| 9,004,203 B2 | 4/2015 | Smith |
| 9,045,178 B2 | 6/2015 | Smith |

(56) References Cited

U.S. PATENT DOCUMENTS

| | | | |
|---|---|---|---|
| 9,096,282 | B2 | 8/2015 | Smith et al. |
| 9,415,819 | B2 | 8/2016 | Vogt |
| 9,463,833 | B2 | 10/2016 | Smith et al. |
| 9,533,723 | B2 | 1/2017 | Smith et al. |
| 9,751,578 | B2 | 9/2017 | Smith |
| 9,862,437 | B2 | 1/2018 | Smith et al. |
| RE46,723 | E | 2/2018 | Smith et al. |
| 9,938,737 | B1 | 4/2018 | Garceau |
| 2002/0175319 | A1* | 11/2002 | Green .................... B66F 7/04 254/45 |
| 2002/0185319 | A1 | 12/2002 | Smith |
| 2004/0211598 | A1 | 10/2004 | Palidis |
| 2004/0240973 | A1 | 12/2004 | Andrews |
| 2006/0027373 | A1 | 2/2006 | Carriere |
| 2006/0213653 | A1 | 9/2006 | Cunningham |
| 2009/0000218 | A1 | 1/2009 | Lee |
| 2009/0188677 | A1 | 7/2009 | Ditta |
| 2009/0200856 | A1 | 8/2009 | Chehade |
| 2009/0283324 | A1 | 11/2009 | Konduc |
| 2010/0224841 | A1* | 9/2010 | Liljedahl ............... B66C 23/48 254/120 |
| 2010/0252395 | A1 | 10/2010 | Lehtonen |
| 2011/0072737 | A1 | 3/2011 | Wasterval |
| 2011/0114386 | A1 | 5/2011 | Souchek |
| 2012/0219242 | A1 | 8/2012 | Stoik |
| 2013/0153309 | A1 | 6/2013 | Smith et al. |
| 2013/0156538 | A1 | 6/2013 | Smith et al. |
| 2013/0156539 | A1 | 6/2013 | Smith et al. |
| 2013/0240300 | A1* | 9/2013 | Fagan .................... B66F 7/10 187/210 |
| 2013/0277124 | A1 | 10/2013 | Smith et al. |
| 2014/0014417 | A1 | 1/2014 | Smith et al. |
| 2014/0054097 | A1 | 2/2014 | Bryant |
| 2014/0158342 | A1 | 6/2014 | Smith |
| 2014/0161581 | A1 | 6/2014 | Smith et al. |
| 2014/0262562 | A1 | 9/2014 | Eldib |
| 2014/0299564 | A1 | 10/2014 | Lin |
| 2015/0053426 | A1 | 2/2015 | Smith et al. |
| 2015/0125252 | A1 | 5/2015 | Berzen |
| 2015/0166134 | A1 | 6/2015 | Trevithick |
| 2015/0166313 | A1* | 6/2015 | Knapp .................... B66F 7/10 254/89 R |
| 2015/0239580 | A1* | 8/2015 | Valenzuela ...... G05B 19/41895 701/50 |
| 2016/0023647 | A1 | 1/2016 | Saunders |
| 2016/0176255 | A1 | 6/2016 | Guiboche |
| 2016/0221620 | A1 | 8/2016 | Smith |
| 2016/0297488 | A1 | 10/2016 | Smith |
| 2017/0021880 | A1 | 1/2017 | Smith |
| 2017/0022765 | A1 | 1/2017 | Csergei |
| 2017/0101144 | A1 | 4/2017 | Higginbotham, II |
| 2017/0327166 | A1 | 11/2017 | Smith |
| 2018/0072543 | A1* | 3/2018 | Rucker ................ G01L 5/0061 |
| 2018/0183362 | A1 | 6/2018 | Jenner |
| 2018/0346041 | A1 | 12/2018 | Smith |
| 2019/0016575 | A1* | 1/2019 | Unger .................... B60S 9/205 |
| 2019/0048558 | A1* | 2/2019 | Unger .................... B66F 3/46 |
| 2019/0152704 | A1 | 5/2019 | Smith |

FOREIGN PATENT DOCUMENTS

| | | |
|---|---|---|
| CA | 2798774 | 9/2015 |
| CA | 2798790 | 10/2015 |
| CH | 359422 | 1/1962 |
| CN | 1515477 | 7/2003 |
| CN | 101139069 | 3/2008 |
| CN | 102566573 | 12/2013 |
| CN | 105060161 | 11/2015 |
| CN | 105446271 | 3/2016 |
| CN | 106672113 | 5/2017 |
| CN | 107314000 | 11/2017 |
| DE | 2418411 | 10/1975 |
| DE | 4107314 | 9/1992 |
| EP | 469182 | 10/1990 |
| GB | 2315464 | 2/1998 |
| WO | 2004103807 | 12/2004 |
| WO | 2006100166 | 9/2006 |
| WO | 2010136713 | 12/2010 |

OTHER PUBLICATIONS

Notice of Pending Litigation Under 37 CFR 1.56 Pursuant to Granted Request for Prioritized Examination Under 37 CFR 1.102€(1), Jun. 28, 2016.
Defendants' First Amended Answer, Affirmative Defenses, and Counterclaims to Plaintiff's Complaint for Patent Infringement, Jun. 27, 2016, p. 9, section 16.
Defendants' Answer, Affirmative Defenses, and Counterclaims to Plaintiff's Complaint for Patent Infringement, Jun. 6, 2016, p. 6, Section 2.
Entro Industries, Inc. brochure "The Future of Rig Walkers", Jun. 2012; 4 pages.
Columbia Industries, LLC brochure "Kodiak Cub Rig Walking System", 2009; 4 pages.
Defendants' Second Amended Answer, Affirmative Defenses, and Counterclaims to Plaintiff's Complaint for Patent Infringement, Jul. 12, 2016, p. 9, Sections 15-18.
Defendant Hydraulic System, Inc.'s Preliminary Invalidity Contentions, Nov. 18, 2016, pp. 1-6.
Defendant Hydraulic System, Inc.'s Preliminary Invalidity Contentions, May 26, 2017, pp. 1-6.
Colby, Col. Joseph M., "Torsion-Bar Suspension", SAE Quarterly Transactions, vol. 2, No. 2, pp. 195-200, Apr. 1948.
Airstream Inc., "Airstream's New Dura-Torque Axle" Pamphlet.
U.S. Appl. No. 13/711,193, filed Dec. 11, 2012, Rotation Device for Load Transporting Apparatus, U.S. Pat. No. 8,573,334.
U.S. Appl. No. 13/711,269, filed Dec. 11, 2012, Alignment Restoration Device for Load Transporting Apparatus, U.S. Pat. No. 8,561,733.
U.S. Appl. No. 13/711,315, filed Dec. 11, 2012, Centering Device for Load Transporting Apparatus, U.S. Pat. No. 8,490,724.
U.S. Appl. No. 13/909,969, filed Jun. 4, 2013, Rig With Drawworks and Hoisting Device, U.S. Pat. No. 9,096,282.
U.S. Appl. No. 13/917,531, filed Jun. 13, 2013, Centering Device for Load Transporting Apparatus, U.S. Pat. No. 8,839,892.
U.S. Appl. No. 14/028,111, filed Sep. 16, 2013, Rotation Device for Load Transporting Apparatus, U.S. Pat. No. 9,045,178.
U.S. Appl. No. 14/028,150, filed Sep. 16, 2013, Alignment Restoration Device for Load Transporting Apparatus, U.S. Pat. No. 9,004,203.
U.S. Appl. No. 14/529,566, filed Oct. 31, 2014, Mounting Structure With Storable Transport System, U.S. Pat. No. 9,533,723.
U.S. Appl. No. 15/094,664, filed Apr. 8, 2016, Alignment Restoration Device for Load Transporting Apparatus, U.S. Pat. No. 9,463,833.
U.S. Appl. No. 15/141,587, filed Apr. 28, 2016, Alignment Restoration Device for Load Transporting Apparatus.
U.S. Appl. No. 15/285,366, filed Oct. 4, 2016, Mounting Structure With Storable Transport System, U.S. Pat. No. 9,862,437.
U.S. Appl. No. 15/666,149, filed Aug. 1, 2017, Low Profile Roller Assembly.
U.S. Appl. No. 15/828,073, filed Nov. 30, 2017, Mounting Structure With Storable Transport System.
U.S. Appl. No. 15/867,382, filed Jan. 10, 2018, Alignment Restoration Device for Load Transporting Apparatus.
U.S. Appl. No. 15/807,176, filed Nov. 8, 2017, Lifting Loads With Lifting Devices.
Airstream Inc., "Airstream's New Dura-Torque Axle" Pamphlet. 1962.

* cited by examiner

AUTOMATIC WALKING FOR A LOAD TRANSPORTING APPARATUS

A portion of the disclosure of this patent document contains material which is subject to copyright protection. The copyright owner has no objection to the facsimile reproduction by anyone of the patent document or the patent disclosure, as it appears in the United States Patent and Trademark Office patent file or records, but otherwise reserves all copyright rights whatsoever.

This application claims priority to U.S. Provisional Application No. 62/542,641 filed Aug. 8, 2017, entitled AUTOMATIC WALKING FOR A LOAD TRANSPORTING APPARATUS, and is a continuation-in-part of U.S. patent application Ser. No. 15/807,176, entitled: LIFTING LOAD WITH LIFTING DEVICES filed Nov. 8, 2017, the contents of which are both hereby incorporated by reference in their entireties.

U.S. Pat. Nos. 8,490,724; 8,561,733; 8,839,892; 8,573,334; and 9,004,203 are all incorporated by reference in their entireties.

FIELD OF THE INVENTION

This disclosure relates generally to apparatuses for transporting a load, and more particularly to automatically detecting, raising, and moving loads.

BACKGROUND

Moving extremely heavy loads has generally been a complicated task because of the large forces involved in lifting and transporting the heavy loads. When possible, large loads are often transported by disassembling or breaking up the load into multiple smaller loads. However, this break-down and subsequent reassembly process can be very time consuming, especially when a heavy load is only moved a small distance, or needs to be repositioned.

For heavy loads that need periodic movement or adjustment, devices commonly referred to as "walking machines" or "walkers" were developed. These machines typically move the heavy loads over small distances in incremental stages. Walking machines are particularly useful for moving large structures, such as oil rigs, which often times need to be moved in order to properly position them over pre-drilled wells in oil fields, or moved to a new location that is undergoing oil exploration.

Instead of using wheels driven by rotational forces to move heavy loads, walking machines typically use hydraulic lift cylinders to lift the load above a supporting surface, and then move or rotate the load relative to the supporting surface by transporting the load via rollers or tracks in the walking machines. U.S. Pat. No. 5,921,336 to Parker and U.S. Pat. No. 6,581,525 to Smith show two methods of using walking machines to move heavy loads, such as oil rig structures. The '525 patent shows elongated beams under several rollers and lift cylinders, which allow the load from the lift cylinders and rollers to be spread over a large area.

The operator may activate all lifting devices simultaneously until a first lifting device begins lifting the load off of the base surface. The operator then manually activates the remaining lifting devices currently not contacting the base surface. After all lifting devices are in contact with the base surface, the operator causes all lifting devices to lift all load points together to lift the load off of the base surface.

The operator may extend travel mechanisms until all support feet are at the end of stroke, then the operator may extend the lifting devices while watching each corner and stop extending the lifting devices when the load bearing frame is sufficiently off the base surface.

The operator may retract the travel mechanisms until all support feet are at the beginning of stroke. The operator may then retract the lift mechanisms until all lifting devices have sufficiently lifted all support feet off of the base surface by watching one of the support feet. To ensure full clearance during moving and during resetting, the operator may over-extend the lifting devices to ensure clearance for parts of the structure that are not visible or over-retract the lifting devices to ensure clearance for the support feet that are not visible. This over-extension may increase the amount of time to complete the stepping operation.

DETAILED DESCRIPTION

As described above, walkers, or walking machines, are vehicles that transport heavy loads, such as entire oil well drilling rigs. Such loads weigh as much as several thousand tons and may be required to be sequentially positioned very precisely over spaced-apart well bores, for example. Embodiments of the present concept are directed to controlling walking apparatuses, such as walking machines, for moving heavy loads over small distances with the ability to fine-tune the resultant position of the heavy load.

For ease of understanding, the terms, "walkers," "walking machines," "walking devices," and "walking apparatuses" are used interchangeably below. Walking apparatus or systems may include one or more walking machines. Additionally, a walking machine's subassembly of components that facilitate movement of the walking machine are referred herein as a "walking mechanism." Walking machines may incorporate one or more walking mechanisms, depending on the specific configuration of a walking machine.

FIGS. 1A-1F show a control system 100 that streamlines the process of walking load transporting apparatus 115 that provide multiple lift points at different corners of a load 110. Walking apparatus are described in U.S. Pat. No. 8,490,724 which is herein incorporated by reference in its entirety.

Figure 1A:
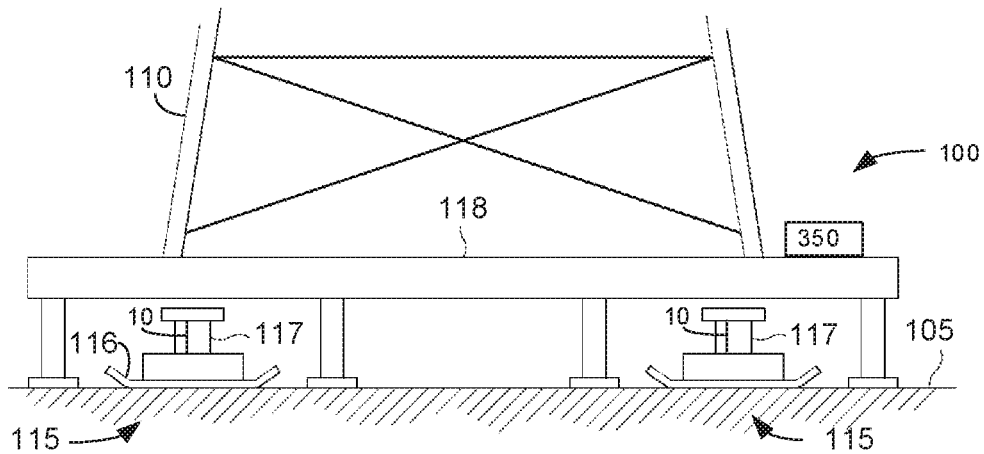
FIGS. 1A-1F show a stepping operation for a transporting apparatus.
Figure 1B:
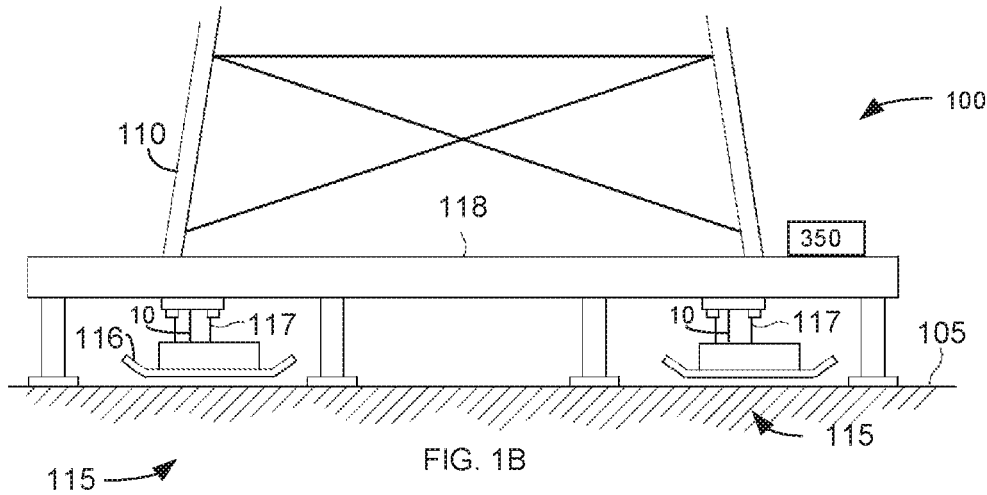

Referring to FIG. 1A, walking apparatuses 115 are positioned on a base surface 105 below or adjacent to a load 110. Referring to FIG. 1B, the walking apparatus 115 may attach to load 110 and in a retracted position may extend above base surface 105. There are many possible connection variations for connecting the walking apparatus 115 to load 110. For example, walking apparatus 115 may attach to a load bearing frame 118 that supports load 110.

Figure 1C:
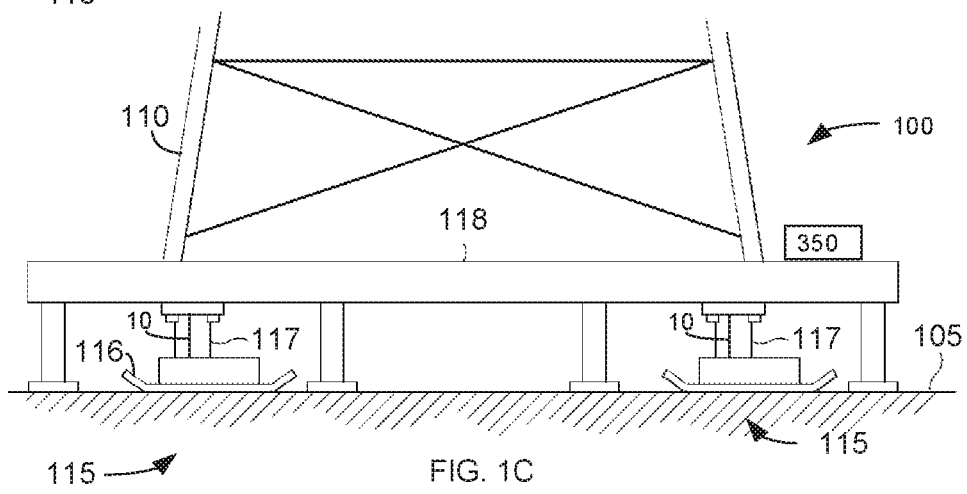

Referring to FIG. 1C, walking apparatuses 115 are operated so that a portion of support feet 116 contact base surface 105. Walking apparatus 115 may be operated substantially simultaneously, or may be operated in intervals depending on the conditions of base surface 105 and loading by load 110.

Figure 1D:
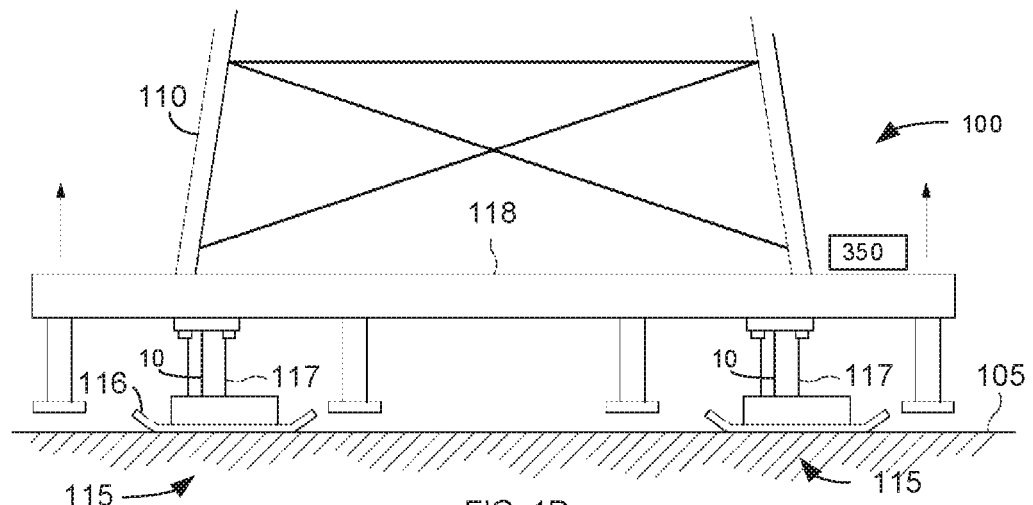

Referring to FIG. 1D, walking apparatuses 115 are operated to lift load 110 above base surface 105. Walking apparatus 115 again may be operated substantially simultaneously to lift the load 110, or may be operated in intervals depending on the ground and load conditions associated with the desired move.

Figure 1E:
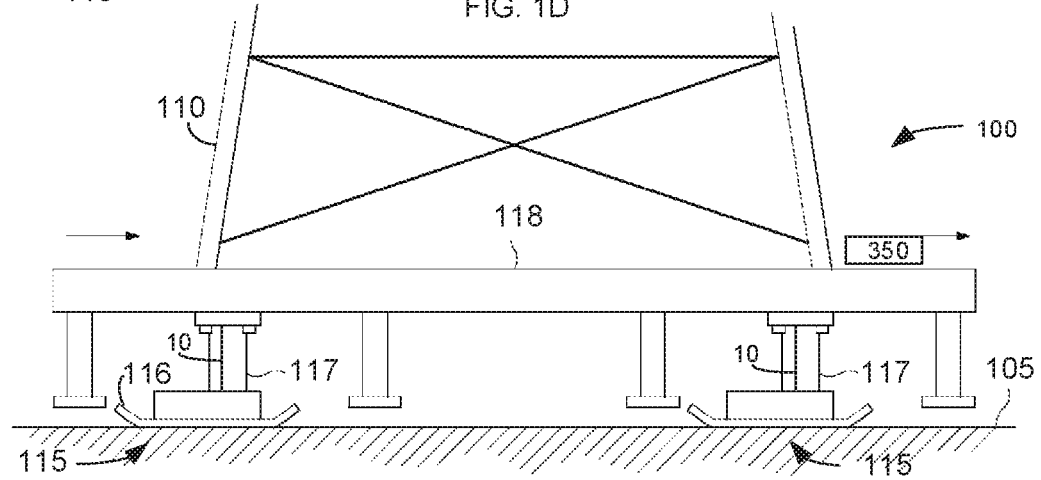

Referring to FIG. 1E, walking apparatuses 115 are operated to move load 110 to the right. Although FIG. 1E shows load 110 being moved to the right, walking apparatus 115 can be operated to move load 110 in a variety of directions depending on the desired final location.

Figure 1F:
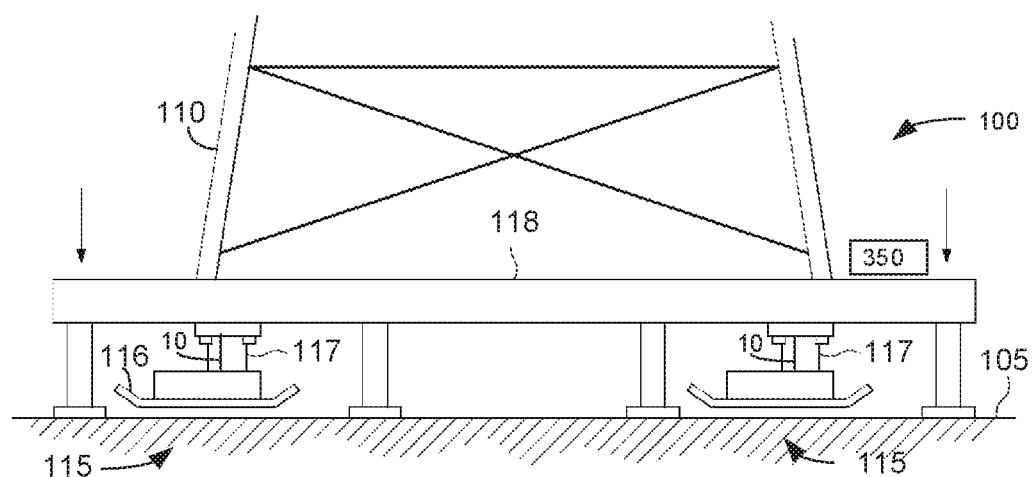

Referring to FIG. 1F, walking apparatus 115 are operated to lower load 110 to base surface 105 and to raise feet 116 of walking apparatus 115 above base surface 105. That is, after load 110 is positioned on base surface 105, walking apparatus 115 are further operated so that they are raised above base surface 105. Here, the connection between walking apparatus 115 and load 110 support the walking apparatus 115 when raised above base surface 105.

After walking apparatus 115 are raised above base surface 105, they are further operated to be repositioned for another movement walking step, such as by moving support feet 116 to the right in a position as shown in FIG. 1B. That is support feet 116 and related structures are moved to the right while raised above base surface 105. After walking apparatus 115 have been repositioned, they are lowered to base surface 105 as shown in FIG. 1C. This completes a single walking cycle, and further walking cycles or steps can be performed by repeating the steps described above with respect to FIGS. 1B to 1F.

Auto Walk

Control system 100 controls walking apparatus 115 through four automated operations of a walking step. The four stepping operations include:
1: Extending travel mechanisms to start the walking cycle;
2: Extending lifting devices 117 to press support feet 116 into base surface 105 and lift load bearing frame 118 off of base surface 105;
3: Retracting the travel mechanisms to move load bearing frame 118; and
4: Retracting lifting devices 117 to lower load bearing frame 118 onto base surface 105 and retract support feet 116.

Control system 100 uses computer 350 to control all four stepping operations. During lifting operation 2 and retracting operation 4, computer 350 may extend and retract lifting devices 117 a specific consistent amount to reduce the amount of time spent completing the walking cycle.

During a load bearing frame moving operation 3, an operator may change the elevation of load bearing frame 118 to clear obstacles such as an uneven base surface or bent rig mats. Control system 100 may adjust the amount of extension of lifting devices 117 and continue subsequent walking stages using the new extension height.

Control system 100 may perform similarly during reset operations. An operator may adjust the amount support feet 116 are raised above base surface 105 or raised above the bottom of the load bearing frame 118. Control system 100 may operate the travel mechanisms during subsequent reset operations at the new support foot height.

The following terms are for explanation purposes and it should be understood that other terms and definitions may be use to further describe these elements.

Lift Point: May refer to a point on a structure where a walking apparatus lifts a structure.

Load: May refer to a force exerted by a walking apparatus on the base surface, any amount of substance or weight lifted or supported by an individual walking apparatus, or may refer to an entire amount of substance or weight lifted by all of the walking apparatus.

Walking Apparatus: May refer to an apparatus configured to move a load over a base surface.

Load-Bearing Frame: May refer to the frame holding the load. The walking apparatus may lift the load through the load-bearing frame. This is often either a frame that the entire load sits on or a smaller frame that is welded to the load or pinned to the load. In other examples, the walking apparatus may lift the load directly.

Lifting Device: May refer to a device used for lifting the load off of the base surface. Typically a hydraulic cylinder, but can be any device capable of displacing a load vertically such as, but not limited to, a pneumatic cylinder, rack and pinion gear with a motor, screw with a motor, or any combination of the above apparatus with linkage that redirects the useful motion.

Support Foot: May refer to device having a relatively stiff surface used to distribute the load on a lifting device over an area on the base surface, often used to lower the ground bearing pressure on the base surface.

Base Surface: May refer to a surface under the load and load-bearing frame. Typically the ground but may be any surface on which walking occurs.

Control System: May refer to a system of sensors, controllable devices, and a computer used to automatically manipulate a device.

Computer: May refer to a device such as a microcontroller or microprocessor which is programmable to manipulate outputs based on information from inputs. The computer may operate a software program that includes logic which repeatedly produces a known and specific output based on an input.

Remote Control Device: May refer to a device used to receive inputs for the computer and display outputs from the computer. In one embodiment, the remote control device is wireless. Inputs may include angle set points, valve position set points, steering mode, automatic mode, autowalk direction and magnitude, and support foot height adjustments. Outputs may include light emitting diodes (LEDs) and display data on a screen.

Load Sensor: May refer to a device used to measure, either directly or indirectly, the load on a lifting device. One example embodiment includes a pressure sensor that measures pressure on the bore side of a jack cylinder. A computer may convert the bore pressure to a load. Other example embodiments may include a sensor that measures displacement of a component with a known load vs displacement relationship, e.g. a load cell. The computer may convert this displacement to a load based on the load vs displacement relationship.

Displacement Sensor: May refer to a device used to measure, either directly or indirectly, the displacement of a lifting device. One example consists of a displacement sensor that detects the position of a cylinder rod in the lifting device. Other example, embodiments may consist of optical sensors, ultrasonic sensors, string sensors, or rotary sensors with a mechanical conversion from a linear position.

Figure 2:
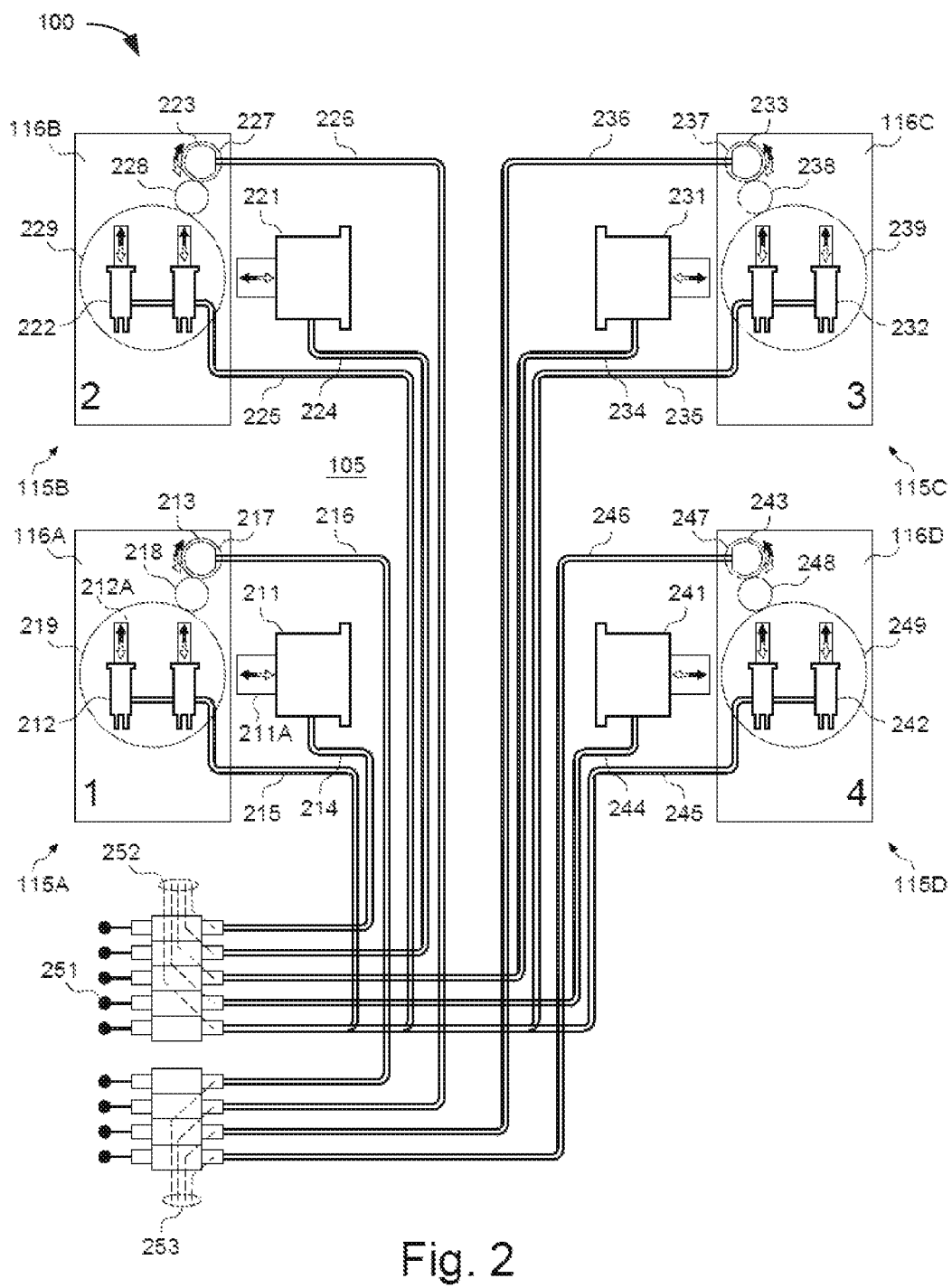
FIG. 2 shows a control system used for raising a load.

FIG. 2 shows control system 100 in more detail. This example embodiment shows hydraulic valves, cylinders, and motors with interconnected hydraulic lines. Other embodiments may include electrical controls or mechanical controls.

Figure 3:
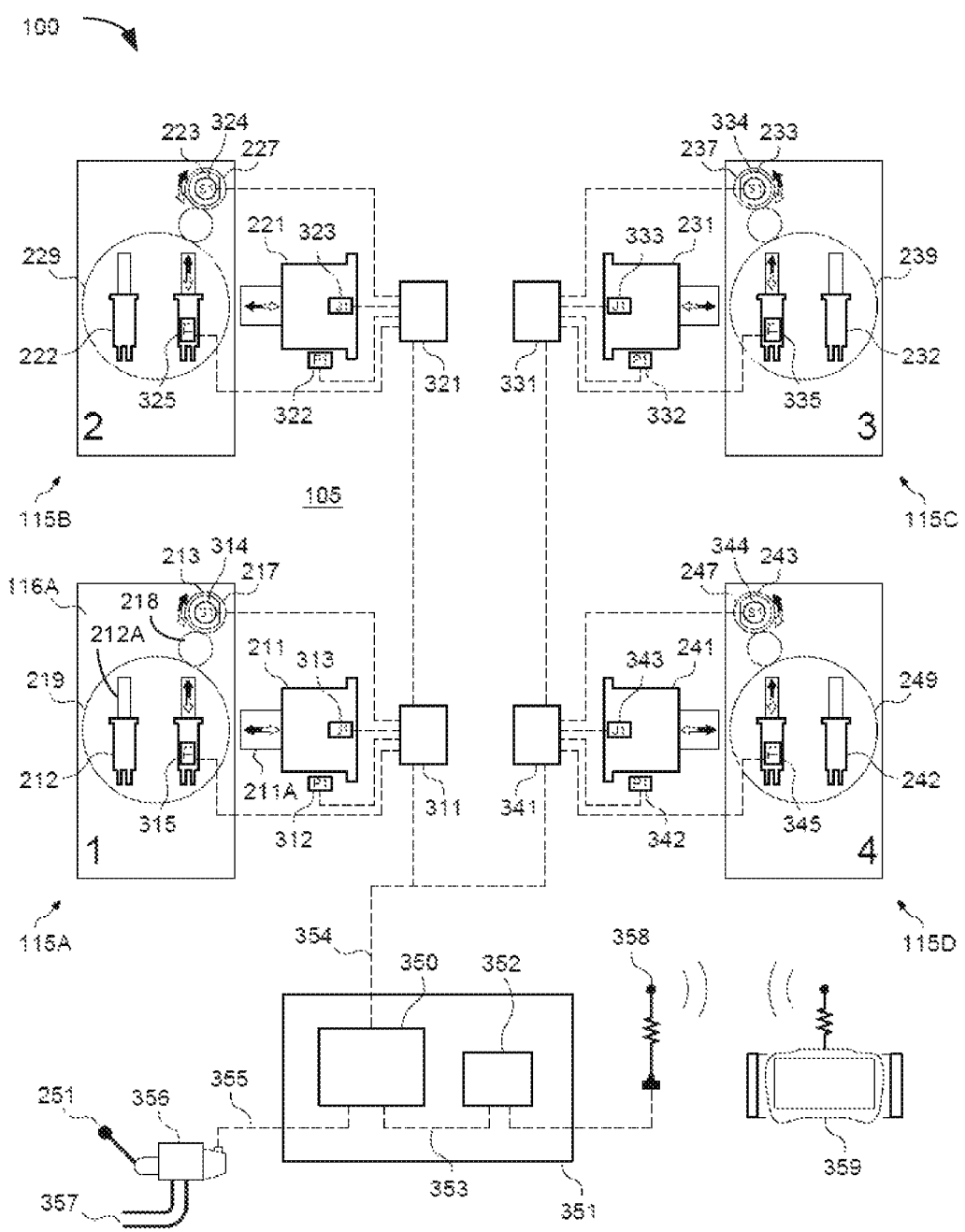
FIG. 3 shows sensors used in the control system of FIG. 2.

Lifting devices 211, 221, 231, and 241 in FIGS. 2 and 3 correspond to lifting devices 117 in FIGS. 1A-1F. Lifting devices 211, 221, 231, and 241 are shown in sideways horizontal positions in the schematics of FIGS. 2 and 3 for explanation purposes. However, it should be understood that lifting devices 211, 221, 231, and 241 are typically arranged as shown by lifting devices 117 in FIGS. 1A-1F to extend and retract vertically to lift and lower load bearing frame 118 and attached load 110.

Walking apparatus 115A may use lifting device 211 to lift up and lower a lift point 1 on load 110. In one example lifting device 211 may include a hydraulic cylinder 211A, similar to that shown in lifting mechanism 720 of U.S. Pat. No. 8,561,733. A translation device 212 is alternatively referred to as a travel mechanism and may include one or more hydraulic cylinders 212A that move support foot 116A relative to the load resulting in a translation of lift point 1 relative to the base surface when lifting device 211 is in a loaded state. One example, embodiment of translation device 212 may include hydraulic cylinders used in travel mechanism 860 of U.S. Pat. No. 8,561,733.

A steering device 213 rotates an orientation of translation device 212 relative to the load resulting in a translation of walking apparatus 115A in a specific direction relative to base surface 105 when lifting device 211 in a loaded state. In one example, steering device 213 is a hydraulic motor.

A lifting control signal 214 causes lifting device 211 to extend or retract lifting or lowering foot 116A relative to the load. In one example, lifting control signal 214 may include a set of two hydraulic lines to pressurize the bore or the rod side of cylinder 211A in lifting device 211. Bore side pressure may extend cylinder 211A and rod side pressure may retract cylinder 211A.

A translation control signal 215 may cause translation device (travel mechanism) 212 to extend or retract and translate (move) foot 116A relative to the load. In one example embodiment, control signal 215 may include a set of hydraulic lines that pressurize the bore or the rod side of cylinders 212A in translation device 212. A bore side pressure may extend cylinders 212A and a rod side pressure may retract cylinders 212A.

A steering control signal 216 may cause steering device 213 to rotate clockwise or counterclockwise. This adjusts the orientation of translation device 212 with respect to the load. In one embodiment, steering control signal 216 may include a set of hydraulic lines. One of the hydraulic lines may rotate steering device 213 in a clockwise rotation while the other hydraulic line may rotate steering device 213 in a counter-clockwise rotation.

A drive pinion 217 may transmit a torque causing steering device 213 to move into an idle state. An idle pinion 218 may maintain a clockwise rotation of a bull gear 219 for a clockwise rotation of drive pinion 217. Rotation of bull gear 219 rotates the orientation of translation device 212.

The example below discusses four walking apparatus, but it should be understood that any number of walking apparatus may operate together as described below to move the load. Walking apparatus 115B-115D operate similar to walking apparatus 115A and may include lifting devices 221, 231, and 241, respectively, that operate similar to lifting device 211. Walking apparatus 115B-115D may include translation devices 222, 232, and 242, respectively that operate similar to translation device 212. Walking apparatus 115B-115D may move feet 116B-116D, respectively, relative to the load resulting in a translation of lift points 2, 3, and 4, respectively, relative to base surface 105 when lifting device 221, 231, and 241, respectively, are in a loaded state.

Walking apparatus 115B-115D may include steering devices 223, 233, and 243, respectively that operate similar to steering device 213. Steering devices 223, 233, and 243 may rotate orientations of translation device 222, 232, and 242, respectively, relative to the load.

Walking apparatus 115B-115D may include lifting control signals 224, 234, and 244, respectively that operate similar to lifting control signal 214 extending or retracting cylinders in lifting devices 221, 231, and 241, respectively. This results in lifting or lowering feet 116B, 116C, and 116D, respectively.

Walking apparatus 115B-115D may include translation control signals 225, 235, and 245, respectively, that operate similar to translation control signal 215 and cause cylinders in translation devices 222, 232, and 242 to extend or retract and correspondingly translate (move) feet 116B, 116C, and 116D, respectively, relative to the load.

Walking apparatus 115B-115D may include steering control signals 226, 236, and 246, respectively, that operate similar to steering control signal 216 and cause steering devices 223, 233, and 243, respectively, to rotate clockwise or counterclockwise. This rotation adjusts the orientation of the translation devices on bull gears 229, 239, and 249, respectively, with respect to the load.

Walking apparatus 115B-115D may include drive pinions 227, 237, and 247, respectively that operate similar to drive pinion 217 and transmit a torque causing steering devices 223, 233, and 243 to move into idle states. Idle pinions 228, 238, and 248 may operate similar to idle pinion 218 and maintain a clockwise rotation of bull gears 229, 239, and 249, respectively, for a clockwise rotation of drive pinions 227, 237, and 247, respectively.

Control handles 251 may create manual input signals for inputting to any of the control signal lines. Computer control signals 252 are used for controlling the translation and lifting in walking apparatus 115A-115D and are generated by computer 350 shown in FIGS. 1A-1F and FIG. 3 and may be converted into hydraulic control signals as described above. Computer control signals 253 are also used for steering walking apparatus 115A-115D and are generated by computer 350 and may be converted into hydraulic control signals as described above.

Control system 100 may use control signals 253 to control the displacement of lifting 211, 221, 231, and 241 and determine the associated valve position and/or throttle position for the hydraulic cylinders that raise and lower the load. For example, computer 350 may generate pulse width modulation (PWM), voltage, current or digital signals 252 and 253 that proportionally control the displacement of valves that produce the hydraulic control signals.

FIG. 3 shows an overview of the sensors and processors used in control system 100. One example embodiment shows an electrical network bus 354 connecting a control panel 351 to multiple different sensors P, T, S and J located on each walking apparatus 115A-115D. Other example embodiments may consist of direct electrical lines connected to each sensor P, T, S, and J, wireless signals communicating with sensors P, T, S, and J, or hydraulic or mechanical feedback from the lifting, transition, and/or rotation devices in walking apparatus 115A-115D. Sensors P, T, S, and J may refer to sensors located at any one of walking apparatuses 115A-115D. Sensors P1-P4, T1-T4, S1-S4, and J1-J4 refer to sensors located at a specific walking apparatus 115A-115D respectively.

Walking apparatus 115A, 115B, 115C, and 115D may include associated sub-panels 311, 321, 331, and 341, respectively that connect associated sensors P, J, S, and T to network bus 354. Other example embodiments may include tee's or separate bus lines 354 running to each sensor.

The explanation below may refer to sensors P, T, J, and S associated with a specific walking apparatus 115. It should be understood that the sensors P, T, J, and S may be connected and operate similarly in any of walking apparatus 115A, 115B, 115C, and 115D. Sensors P1, J1, S1, and T1 in walking apparatus 115A are alternatively referred to by reference numbers 312, 313, 314, and 315, respectively.

Sensors P2, J2, S2, and T2 in walking apparatus 115B are alternatively referred to by reference numbers 322, 323, 324, and 325, respectively. Sensors P3, J3, S3, and T3 in walking apparatus 115C are alternatively referred to by reference numbers 332, 333, 334, and 335, respectively. Sensors P4, J4, S4, and T4 in walking apparatus 115D are alternatively referred to by reference numbers 342, 343, 344, and 345, respectively. Again, in other examples, there may be more or fewer walking apparatuses. For example, three walking apparatuses 115 may lift the load bearing frame from three different zones or five walking apparatuses 115 may lift the load bearing frame from five different zones.

Referring to walking apparatus 115A, pressure sensor 312 senses the pressure on lifting device 211. The sensed pressure is converted into a load value by program logic run by processor 350 based on the area of the bore side of cylinder 211A. Other example embodiments may include directly measuring load between lifting device 211 and the load or between lifting device 211 and base surface 105. Another example embodiment may measure deflection of members coupled to lifting device 211 and configured to identify the load carried by lifting device 211.

Lifting device displacement sensor 313 senses displacement of lifting device 211. This example embodiment shows sensor 313 embedded inside lifting device 211 and directly measuring the displacement of cylinder 211A. Other example embodiments may include external linear displacement sensors, rotary sensors connected to a rack and pinion, optical distance sensors, ultrasonic distance sensors, or string pot sensors. Displacement sensor 313 also may identify the valve position or throttle position that determines how fast lifting device 211 is displaced and identifies a maximum available displacement speed.

Steering device sensor 314 senses the orientation of steering device 213. This example embodiment shows a rotary position sensor 314 mounted on the back of steering device 213 which is coupled to bull gear 219 through idle pinion gear 218. Other example embodiments may include a linear position sensor coupled to bull gear 219 through a chain or cable that wraps around bull gear 219, an optical sensor counting teeth on bull gear 219, or a rotary position sensor mounded directly to bull gear 219.

A translation device sensor 315 senses the position of translation device 212. In one example embodiment, a linear displacement sensor 315 is mounted inside translation device 212 and senses the position of pistons 212A inside of translation device 212. Other embodiments may include other types of sensors measuring either directly or indirectly the extension position of translation device 212. Another example embodiment may include sensors that detect when pistons 212A in translation device 212 are fully extended or fully retracted.

As mentioned above, pressure sensors 322, 332, and 342 in walking apparatus 115B-115D, respectively, may operate similar to pressure sensor 312 in walking apparatus 115A. Displacement sensors 323, 333, and 343 in walking apparatus 115B-115D, respectively, may operate similar to displacement sensor 313 in walking apparatus 115A. Steering device sensors 324, 334, and 344 in walking apparatus 115B-115D, respectively, may operate similar to steering device sensor 314 in walking apparatus 115A. Translation device sensors 325, 335, and 345 in walking apparatus 115B-115D, respectively, may operate similar to translation device sensor 315 in walking apparatus 115A.

Control panel 351 houses some of the electrical equipment used in control system 100. Computer 350 uses pre-programmed logic to control walking apparatus 115A-115D based on inputs from any of sensors P1, J1, S1, and T1. A wireless receiver 352 receives and sends information back and forth between computer 350 and a remote control device 359.

Communication link 353 connects wireless receiver 352 with computer 350. In one example embodiment, communication link 353 may be a controller area network (CAN) connection. Other embodiments may include direct data lines.

Communication link 354 connects computer 350 with sensors P, J, S, and T in walking apparatus 115A-115D. As mentioned above, communication link 354 may comprise a network line or bus running between sensors P, J, S, and T in walking apparatus 115A-115D and computer 350. Other embodiments may include separate data lines directly connected to each sensor identifying individual voltage, current, and/or digital information. In another embodiment, communication link 354 may include wireless signals shared between sensors P, J, S, and T and computer 350.

Communication link 355 may connect computer 350 with control device 356. Data on communication link 355 may inform control device 356 how to control lifting devices 211, 221, 231, and 241; translation devices 212, 222, 232, and 242; and steering devices 213, 223, 233, and 243. In one embodiment, computer 350 and control device 356 may communicate via pulse width modulation (PWM) signals. In other embodiments, any of control device 356, computer 350, remote control device 359, and/or sensors P, J, S, and T may communicate via a network, such as a local area network (LAN), universal serial bus (USB) network, wireless WiFi network, CAN bus, or a wide area network (WAN) alternatively referred to as the Internet.

Control lines 357 from control device 356 may send control information received from computer 350 or manual controls 251 to lifting devices 211, 221, 231, and 241; translation devices 212, 222, 232, and 242; and steering devices 213, 223, 233, and 243. In one example, control lines 357 include hydraulic lines which control hydraulic pressure and flow to each of the devices.

Antenna 358 is used to receive wireless signals transmitted between receiver 352 and remote control device 359. In one example, antenna 358 receives and transmits wireless signals, such as infrared (IR), Bluetooth, radio, WiFi, etc. Other embodiments may include wires directly connected between remote control device 359 and electrical components in control panel 351.

Remote control device 359 receives inputs from an operator for controlling control system 100. In one example, remote control device 359 is a hand-held unit. In other example embodiments, remote control device 359 may mount directly onto control panel 351 or onto some other components in control system 100.

Remote control device 359 may include buttons, touch screen, paddles, etc. that an operator may use to input control information into control system 100. A display screen in remote control device 359 may receive and display information associated with control system 100. Wireless receiver 352 may convert control signals received from remote control device 359 into network messages to computer 350. Computer 350 then may control lifting devices 211, 221, 231, and 241; translation devices 212, 222, 232, and 242; and steering devices 213, 223, 233, and 243 based on the network messages and data received from sensors P, T, S, and J.

Figure 4:
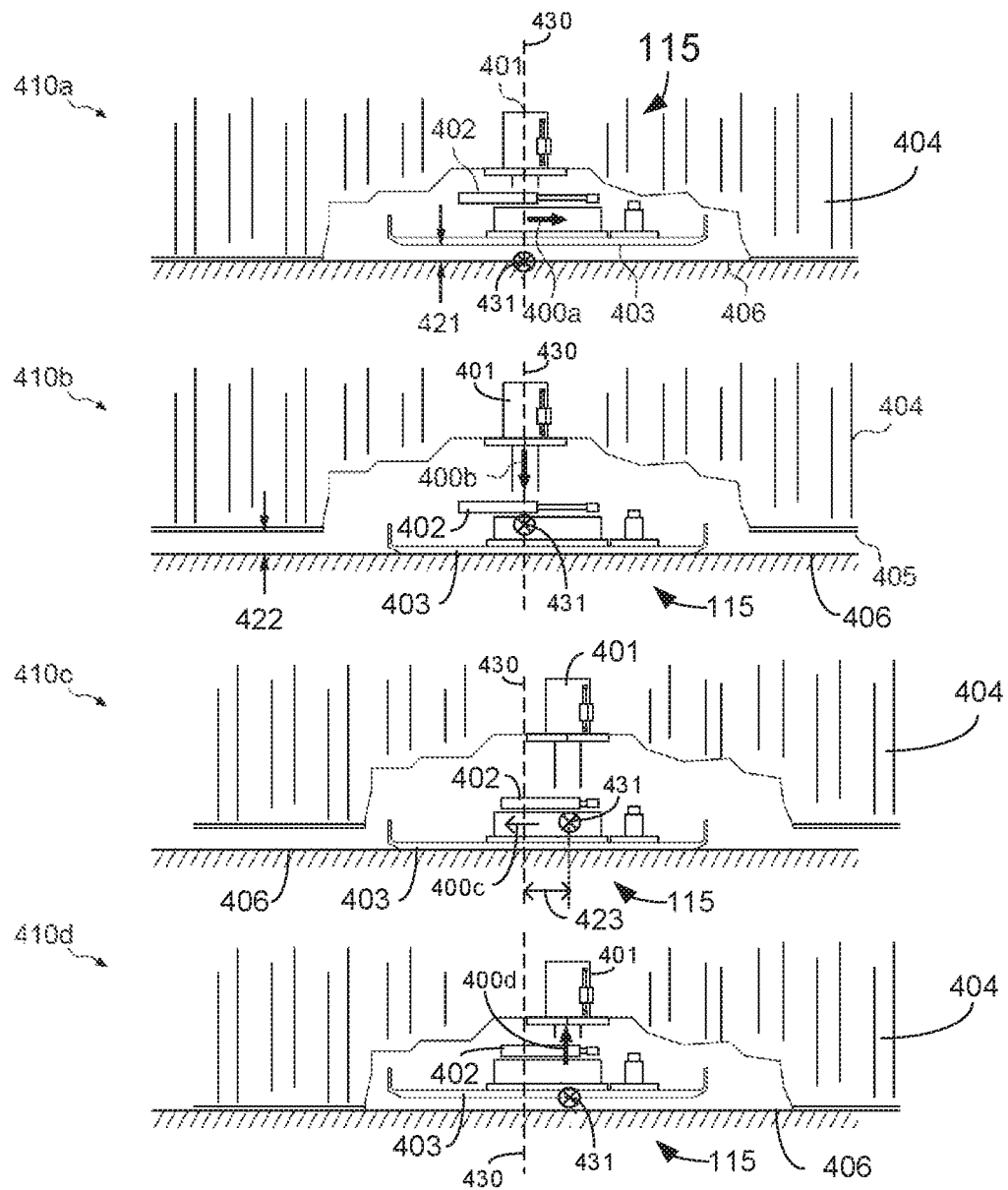
FIG. 4 shows the stepping operations of FIGS. 1A-1F in more detail.

FIG. 4 shows a typical walking cycle. A lifting device 401 extends and retracts a support foot 403 into and off of a base surface 406. Travel mechanism 402 moves support foot 403 laterally to either reset the support foot or move load bearing frame 404. The step operations performed by walking apparatus 115 in FIG. 4 may be similar to the step operations described above in FIGS. 1A-1F.

Base surface 406 is any surface load bearing frame 404 may sit on. For example, base surface 406 may include, but is not limited to, rig mats, concrete, soil, rock, sand, or the like, or any combination thereof.

Lifting device 401 may operate similar to lifting devices 117, 211, 221, 231, and 241 described above. Travel mechanism 402 may operate similar to travel mechanisms 212, 222, 232, and 242 described above. Support foot 403 may operate similar to support foot 116 described above. Load bearing frame 404 may operate similar to load bearing frame 118 described above and base surface 406 may be similar to base surface 105 described above.

Reset operation 400a extends travel mechanism 402 for each walking apparatus 115. Control system 100 may extend travel mechanism 402 to a full or partially extended position. During an associated reset state 410a, travel mechanisms 402 are fully extended ready for a next lifting and stepping cycle.

Extension operation 400b extends lifting devices 401 for each walking apparatus 115. In extension operation 400b, control system 100 extends lifting devices 401 moving support feet 403 downward and lifting load bearing frame 404 off of base surface 406. The distance each lifting device 401 is extended may vary from cycle to cycle due to compressibility differences of base surface 406 beneath each of lifting apparatuses 115. During an associated lifted state 410b, lifting devices 401 are extended enough to lift load bearing frame 404 off base surface 406.

Move operation 400c retracts travel mechanisms 402 in each walking apparatus 115. During an associated moved state 410c, travel mechanisms 402 are fully or partially retracted to move the load on load bearing frame 404 relative to support foot 403. Control system 100 retracts each travel mechanism 402 before setting load bearing frame 404 down at a specific point.

Retraction operation 400d retracts lifting devices 401 for each walking apparatus 115. During an associated unloaded state 410d, lifting devices 401 are retracted enough to lower load bearing frame 404 back onto base surface 406 and raise support feet 403 off of base surface 406.

Reset, Extend, Move, and Retract operations may be performed in reverse in order to achieve horizontal translation in an opposite direction. In the reversed condition, the walking cycle is performed as follows: A reset operation 400a retracts travel mechanism 402, then extend operation 400b extends lifting devices 401, then move operation 400c extends travel mechanism 402, then retract operation retracts lifting devices 401.

For each walking cycle 400, a datum axis 430 may be defined connected to base surface 406, oriented substantially vertically and located substantially on the geometric center of a lifting device 401 during reset state 410a. For each walking cycle 400, a datum point 431 may be defined connected to load bearing frame 404 and located such that datum point 431 lies on datum axis 430 and in the plane of base surface 406 during reset state 410a. For each walking cycle 400, a step distance 423 may be defined as the distance between datum axis 430 and datum point 431 at moved state 410c and at unloaded state 410d.

Computer 350 (FIGS. 1A-1F, and 3) is programmed to retract support foot 403 to a reset height 421 during reset state 410a. Reset height 421 may be a last known height used by computer 350 in an automatic mode to retract lifting devices 401 before extending or retracting travel mechanisms 402 to move support feet 403.

Computer 350 is also programmed to extend support feet 403 and lift load bearing frame 404 above base surface 406 to a moving height 422 during lifted state 410b. Moving height 422 may be a "last known move height", where "last known move height" refers to a previously used height used by computer 350 in an automatic mode to extend lifting devices 401 before extending or retracting travel mechanisms 402 to move load bearing frame 404.

Computer 350 programs a step distance 423 during moved state 410c. For example, step distance 423 may be 24 inches or may be as small as fractions of an inch when fine tuning the location of load bearing frame 404.

Figure 5:
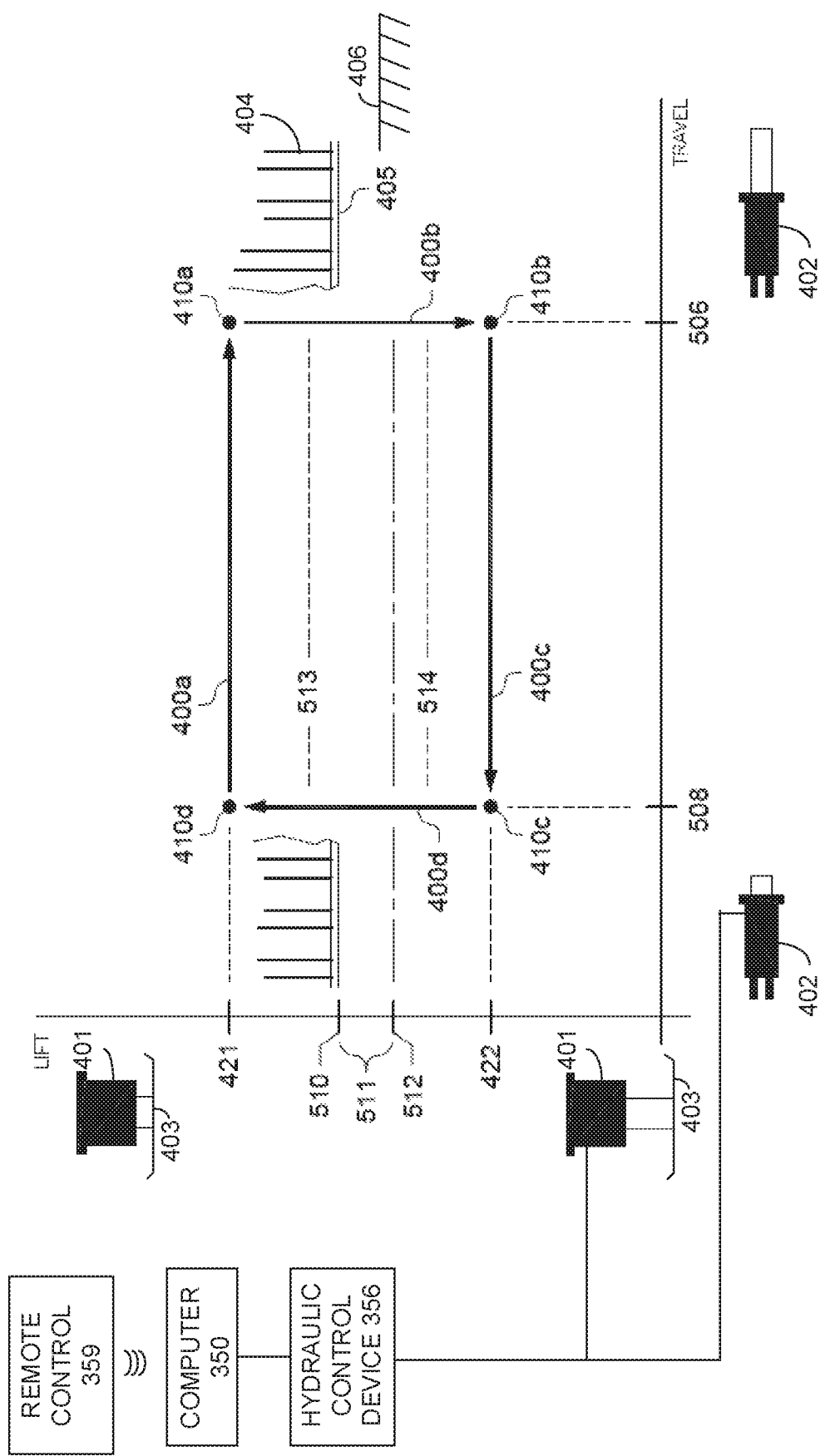
FIG. 5 shows a process for controlling the stepping operation.

FIG. 5 shows a graphical view of a walking cycle for walking apparatus 115. This graphical view illustrates how computer 350 may control lifting device 401 and travel mechanism 402 during a step cycle. A horizontal axis represents an amount of horizontal extension or retraction of travel mechanisms 402 and a vertical axis represents an amount of vertical extension or retraction of lifting devices 401 relative to load bearing frame 404.

At position 506 travel mechanisms 402 are fully extended and at position 508 travel mechanisms 402 are fully retracted. Position 510 is a location of a bottom surface 405 of load bearing frame 404 relative to support feet 403. Computer 350 may use position 510 to determine where base surface 406 is relative to support feet 403.

A transition zone 511 is where the load on load bearing frame 404 transfers to support feet 403. Variable levels of displacement in different lifting devices 401 may be needed to evenly lift load bearing frame 404 off of the base surface 406. This may be due to varying loads between different lift points on load bearing frame 404 and varying compressibility of base surface 406 between the lift points.

A "Start of Lifting Height" 512 is where lifting devices 401 start lifting load bearing frame 404 off of base surface 406. "Start of Lifting Height" 512 accounts for support feet 403 compressing into base surface 406 prior to taking on the full load from load bearing frame 404.

Minimum reset height 513 is the minimum height of support feet 403 during the reset operation. Support feet 403 may drag along base surface 406 if located any closer to load bearing frame bottom surface position 510. If support feet 403 are located below minimum reset height 513 during a reset operation, computer 350 may automatically update reset height 421 and retract lifting devices 401 until support feet 403 are raised above minimum reset height 513.

Minimum moving height 514 is the minimum extension of lifting devices 401 needed to move load bearing frame 404. In other words, minimum moving height 514 is the minimum height of load bearing frame 404 above base surface 406 at which travel may occur. Load bearing frame 404 may drag along base surface 406 if the extension of lifting devices 401 is less than minimum moving height 514. If a moving operation is attempted at less than minimum moving height 514, computer 350 may update a moving height 422 and extend lifting devices 401 until load bearing frame 404 extends above base surface 406 at least minimum moving height 514.

Computer 350 may default to using minimum reset height 513 and minimum moving height 514 to automatically operate walking apparatus 115 through reset state 410a, lifted state 410b, moved state 410c and unloaded state 410d. Computer 350 may use minimum heights 513 and 514 until reset height 421 and/or moving height 422 are selected by an operator as described below.

In one example, minimum reset height 513 and minimum moving height 514 may be permanently stored in memory and configured into computer 350. In another example, an operator may dynamically set minimum reset height 513 and minimum moving height 514 in the field via remote control device 359.

Computer 350 may receive the dynamically selected reset height 421 and moving height 422 from remote control 359 and store the values in memory. Computer 350 may then perform step operations 400 using minimum reset height 513, minimum moving height 514, operator selected reset height 421, and operator selected moving height 422. For example, during reset operation 400a, computer 350 horizontally extends travel mechanisms 402 until support feet 403 reach reset state 410a. During lifting operation 400b, computer 350 extends lifting devices 401 lowing support feet 403 and lifting load bearing frame 404 off of base surface 406. Computer 350 extends lifting devices 401 until load bearing frame 404 reaches moving height 422 at lifted state 410b.

During move operation 400c, support feet 403 are fixed to base surface 406 by friction. Computer 350 retracts travel mechanisms 402 moving load bearing frame 404 horizontally relative to support feet 403. Computer 350 completes moving load bearing frame 404 at moved state 410c.

During retraction operation 400d, computer 350 retracts support feet 403, lowering load bearing frame 404 back onto base surface 406. The load is transferred from support feet 403 back to load bearing frame 404 and support feet 403 are raised above base surface 406 until reaching stored reset height 421 at unloaded state 410d.

Computer 350 automatically repeats step operations 400a-400d using the same reset height 421 and moving height 422 until an adjustment is received from the operator via remote control 359. Thus, computer 350 prevents the operator from having to manually adjust reset height 421 and moving height 422 for each step cycle.

The operator may stop walking apparatus 115 during any of step operations 400a-400d. For example, the operator may stop walking cycle 400 during move operation 400C. Computer 350 may automatically stop retracting travel mechanisms 402 and retract lifting devices 401 to stored reset height 421.

While load bearing frame 404 is lowered back on base surface 406, computer 350 may move support feet 403 into a neutral position and the operator may use remove control 359 to rotate travel mechanisms 402 into a new direction. The operator may resume the walking operation by selecting an input on remote control 359. Computer 350 lowers support feet 403 back down until load bearing frame 404 reaches stored moving height 422. Computer 350 then completes moving operation 400c at the new direction, and starts repeating additional step operations 400d, 400a, 400b, and 400c.

Computer 350 allows a user to stop walking apparatus 115 during any step operation 400, dynamically select a new reset height, moving height, and/or walking direction, and then continue automatically operating at the new selected height and/or direction. These automatically controlled step operations simplify the process of and reduce the time required for repositioning a load.

It should also be understood that the control examples below may be independently performed for each walking apparatus 115 or may be performed for two or more walking apparatuses 115. For example, the control operations described above and below may be performed at the same time for four walking apparatuses 115 located on four corners of load bearing frame 404. In one example, computer 350 may determine the lifting device position and associated support foot height by taking the average of the detected positions for multiple lifting devices 401.

Figure 6:
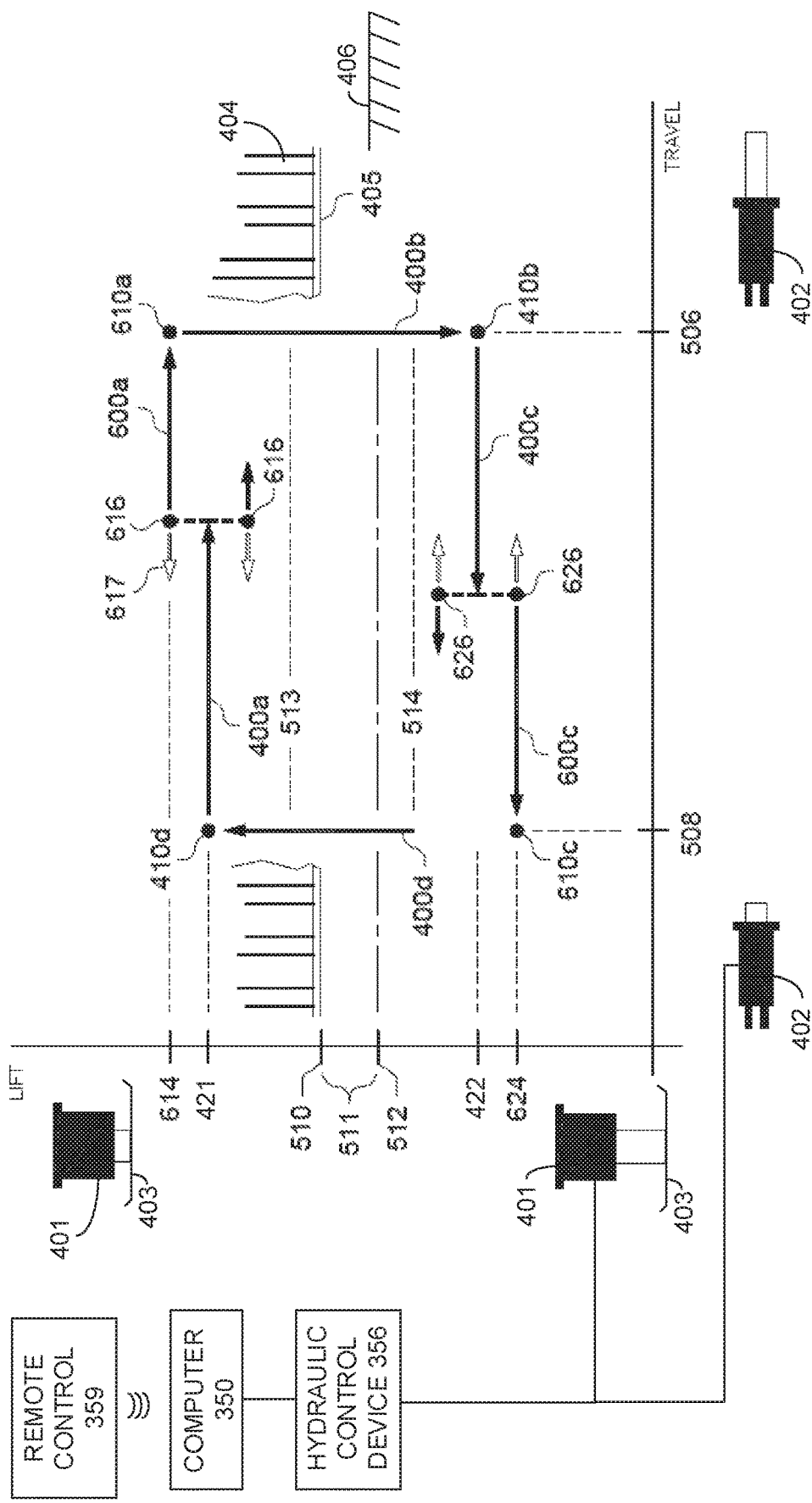
FIG. 6 shows a process for adjusting the height of support feet during the stepping operation.

FIG. 6 is a graphical view of a walking cycle showing how computer 350 responds to an update to reset height 421 or moving height 422. A new reset height 614 is a new height used by computer 350 to raise support feet 403 above base surface 406 during the current and subsequent reset operations 400a. For example, the operator may select a new reset height 614 by stopping the current step operation and adjusting the amount of retraction of lifting devices 401 via remote control 359.

An adjustment signal sent from remote control 359 causes computer 350 to retract or extend lifting devices 401 moving support feet 403 to a new reset height 614, along adjustment 616. The operator may restart the step operation via remote control 401. Computer 350 then continues with new reset operation 600a at new reset height 614. Computer 350 may automatically perform subsequent reset operations 600a at new reset height 614. Computer 350 completes a new reset state 610a after fully extending travel mechanisms 402 while support feet 403 are positioned at new reset height 614. Computer 350 may be directed to perform a reverse step operation. Computer 350 would then perform reverse reset travel operations 617 at new reset height 614.

Computer 350 may extend support feet 403 to a new moving height 624 along adjustment 626 in response to receiving an associated adjustment signal from remote control 359. New moving height 624 changes how far support feet 403 lift load bearing frame 404 above base surface 406.

Computer 350 may receive adjustment signal 626 during moving state 400c. Adjustment signal 626 may raise load bearing frame 404 above current moving height 422 or may lower load bearing frame 404 below current moving height 422. Computer 350 moves support feet 403 to new moving height 624 and then completes moving operation 600c until reaching moved state 610c. Computer 350 also uses new moving height 624 for reverse step operations.

During reset operation 400a, the operator can raise or lower support feet 403 to any new reset height 614 above minimum reset height 513. Computer 350 continues new reset operations 600a at new reset height 614 until another adjustment signal 616 is received from remote control 359.

During moving operation 400c, the operator can raise or lower load bearing frame 404 to any new moving height 624 above minimum moving height 514. Computer 350 continues new moving operations 600c at new moving height 624 until another adjustment signal 626 is received from remote control 359.

In one example, an operator may determine that support feet 403 need to be raised further above base surface 406 to avoid obstructions during reset operation 400a. The operator may interrupt a current reset operation 400a via remove control 359 and raise the support feet 403 higher off base surface 406. Computer 350 then completes the reset operation at the new reset height 614. Computer 350 stores and uses new reset height 614 for subsequent reset operations.

In another example, the operator may determine reset operation 400a is wasting time by raising support feet 403 too far off base surface 406. The operator may interrupt reset operation 400a via remove control 359 and lower support feet 403 closer to base surface 406. The operator may restart the step cycle via remote control 359. Computer 350 continues extending or retracting support feet 403 with travel mechanisms 402 at the new lower reset height. Computer 350 stores and uses the new reset height for subsequent reset operations 600a, reducing the overall time for completing the walking cycles. Computer 350 may receive similar adjustment signals 626 to moving height 422 during lifting operation 400c to adjust the height of load bearing frame 404 above base surface 406. Computer 350 stores and uses the new moving height 624 for subsequent moving operations 600c, further reducing the overall time for moving the walking cycle.

Figure 7:
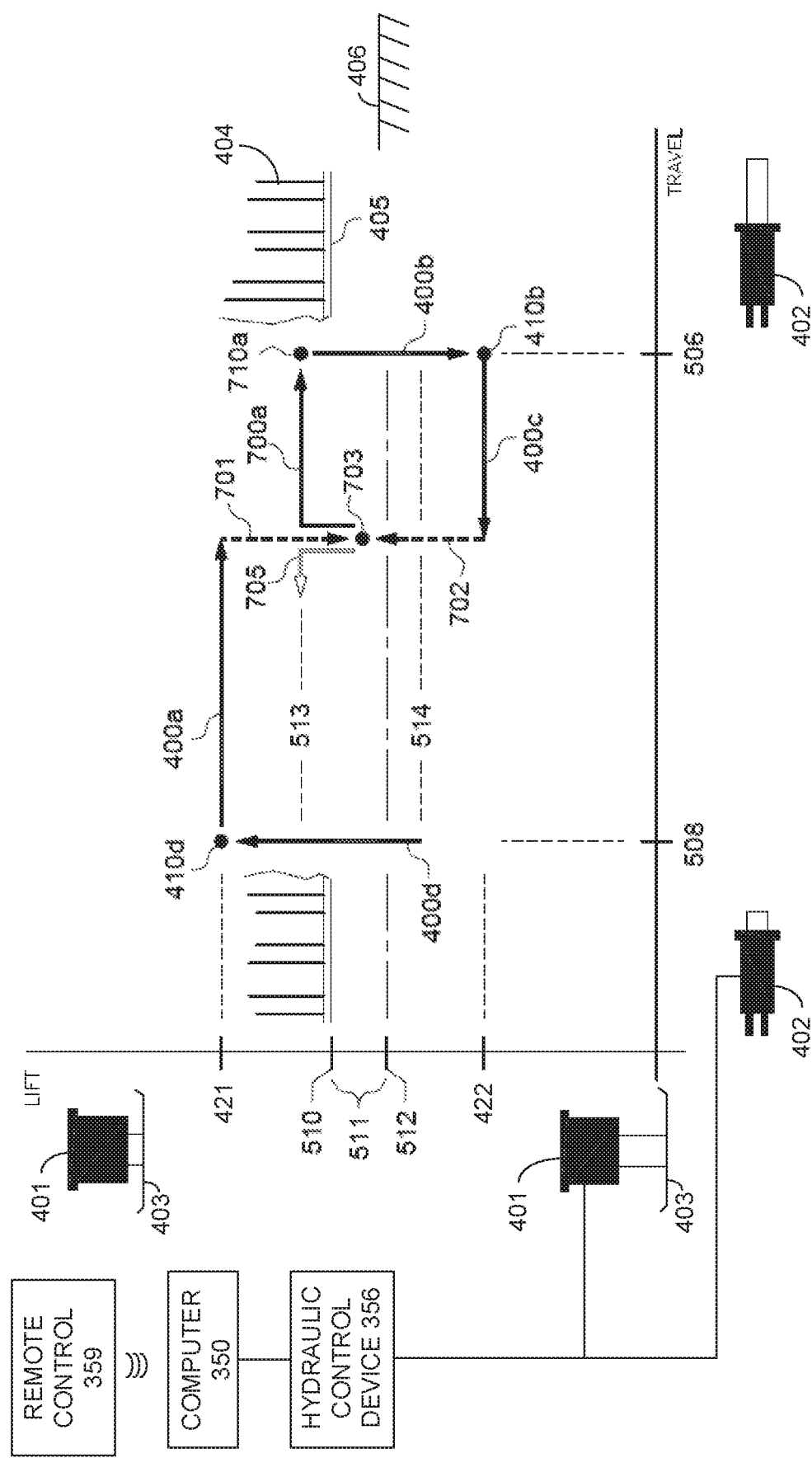
FIG. 7 shows a process for adjusting support feet to a minimum reset height during a reset operation.

FIG. 7 shows a graphical view of a step operation where an adjustment is made to reset height 421 or moving height 422. Computer 350 may send an adjustment 701 during reset operation 400a or may send an adjustment 702 during moving operation 400c. For example, the operator may stop a current reset operation 400a or moving operation 400c via remote control 359. The operator then may move a control lever on remote control 359 that retracts or extends support feet 403. Adjustment 701 may extend support feet 403 from reset height 421 to new height 703, or adjustment 702 may retract support feet 403 from moving height 422 to new height 703. However, the adjustment would locate support feet 403 between minimum reset height 513 and minimum moving height 514, and above "Start of Lifting Height" 512. Because new height 703 is too low for moving operation 400a, continuation of walking cycle causes computer 350 to automatically retract support feet 403 to, or just beyond, minimum moving reset height 513. Computer 350 starts or continues an adjsted reset operation 700a at minimum reset height 513 until reaching reset state 710a. During subsequent reset operations, computer 350 continues to locate support feet 403 at or above minimum reset height 513. Computer 350 also may use minimum reset height 513 during reverse step cycles 705.

Figure 8:
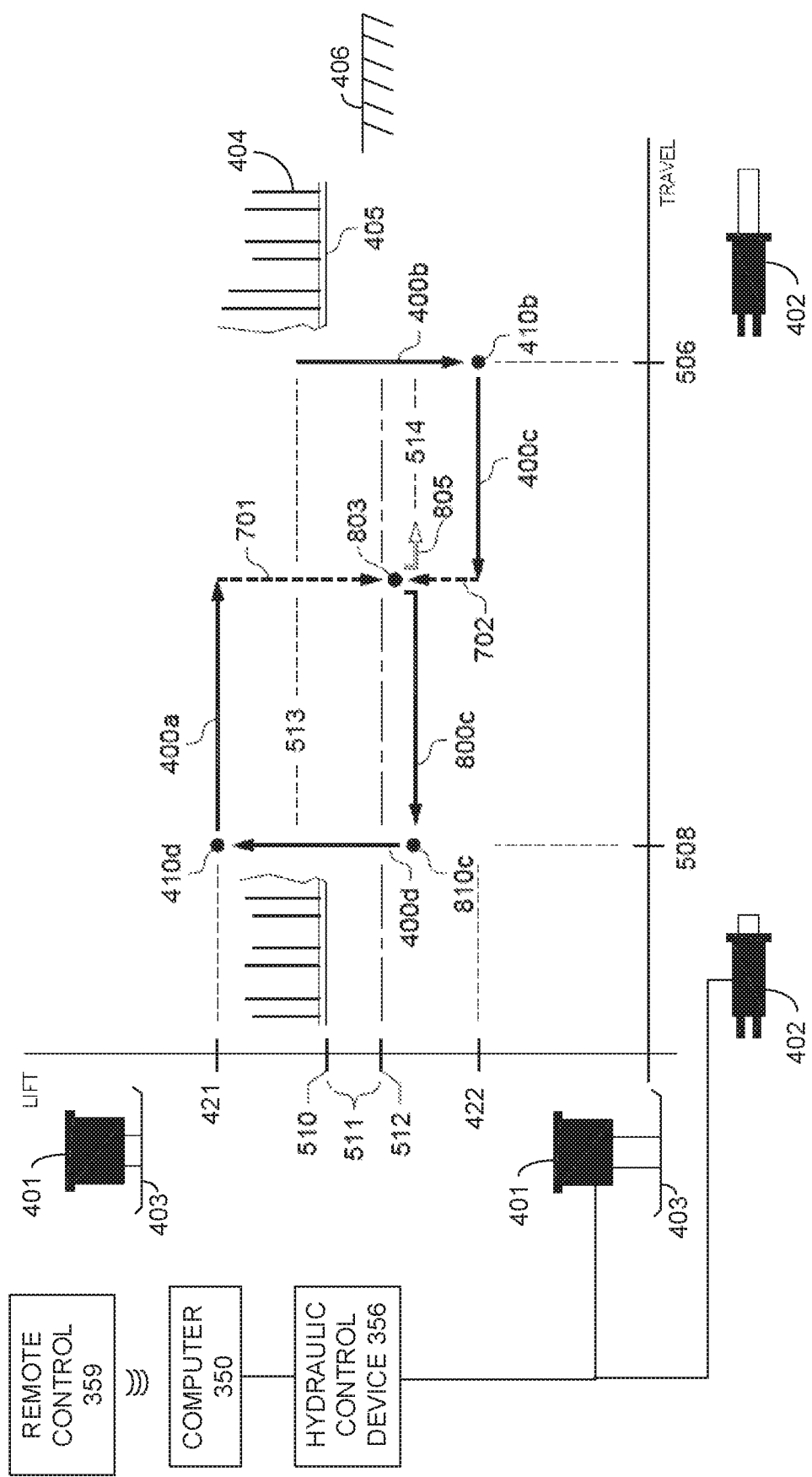
FIG. 8 shows a process for adjusting support feet to a minimum moving height during a moving operation.

FIG. 8 shows a graphical view of a step operation where another adjustment is made to reset height 421 or moving height 422. The adjustment again would locate support feet 403 between minimum reset height 513 and minimum moving height 514, but below "Start of Lifting Height" 512. Computer 350 may perform an adjustment 701 during reset operation 400a or may perform an adjustment 702 during moving operation 400c. For example, the operator may stop a current reset operation 400a or moving operation 400c via remote control 359. The operator may move a control lever on remote control 359 that raises or lowers support feet 403. Adjustment 701 generated by remote control 359 may lower support feet 403 from reset height 421 to a new height 803. Adjustment 702 generated by remote control 359 may raise support feet 403 from moving height 422 to new height 803. Again, new height 803 is below minimum reset height 513 and above minimum moving height 514. Because new height 803 is too low for moving operation 400c, computer 350 may automatically lower support feet 403 to, or just above, minimum moving height 514. Computer 350 starts or continues an adjusted moving operation 800c at minimum moving height 514 until reaching moving state 810c. During subsequent moving operations, computer 350 continues to locate load bearing frame 404 at or above minimum moving height 514. Computer 350 also may use minimum moving height 514 during reverse step cycles 805.

The operator may intentionally lower support feet 403 below minimum reset height 513 and/or lower load bearing frame 404 below minimum moving height 514. This may cause computer 350 to automatically use minimum reset height 513 and/or minimum move height 514 for the remainder of the current step operation and for subsequent step operations. This may further reduce stepping cycle time by minimizing the amount of retraction and extension of support feet 403. Thus, the operator may quickly set the current reset height to the minimum reset height by adjusting the current height to below the minimum reset height.

One advantage of control system 100 is the ability to pick up where a manual lifting adjustment left off. When adjustments are made to the reset height or moving height, computer 350 continues stepping operations at the new selected height. However, when manual adjustments are made below the minimum heights, where support feet 403 or load bearing frame 404 could contact base surface 406, computer 350 automatically adjusts lifting devices 401 to minimum reset height 513 or minimum move height 514. This allows walking apparatus 115 to always pick up and continue walking operations for any operator adjustment entered at any time during the stepping cycle. Computer 350 also allows an operator to use the same raise and lower paddle movements on remote control 359 to more intuitively adjust both the reset and move heights.

These stepping operations may be performed in combination with any of the other lifting and loading operations performed in:

U.S. patent application Ser. No. 15/807,176, entitled: LIFTING LOAD WITH LIFTING DEVICES, filed Nov. 8, 2017; and/or U.S. Provisional Application No. 62/539,969, entitled AUTOMATIC EQUAL DISPLACEMENT FOR A LOAD TRANSPORTING APPARATUS, filed Aug. 1, 2017 which are both incorporated by reference in their entireties.

Computer System

Control system 100 device may include any collection of devices or circuitry that individually or jointly execute a set (or multiple sets) of instructions to perform any one or more of the operations discussed above. The computing device may be part of an integrated control system or system manager, or may be provided as a portable electronic device configured to interface with a networked system either locally or remotely via wireless transmission.

The control system and microcomputer described above may include or communicate with a personal computer (PC), a tablet, a Personal Digital Assistant (PDA), a cellular telephone, a smart phone, a web appliance, or any other machine or device capable of executing instructions 1006 (sequential or otherwise) that specify actions to be taken by that machine.

Computing devices used by the control system may include any collection of devices or circuitry that individually or jointly execute a set (or multiple sets) of instructions to perform any one or more of the operations discussed above. The computing device may be part of an integrated control system or system manager, or may be provided as a portable electronic device configured to interface with a networked system either locally or remotely via wireless transmission.

Processors used in the control system may comprise a central processing unit (CPU), a graphics processing unit (GPU), programmable logic devices, dedicated processor systems, micro controllers, or microprocessors that may perform some or all of the operations described above. The processors may also include, but may not be limited to, an analog processor, a digital processor, a microprocessor, multi-core processor, processor array, network processor, etc.

Some of the operations described above may be implemented in software and other operations may be implemented in hardware. One or more of the operations, processes, or methods described herein may be performed by an apparatus, device, or system similar to those as described herein and with reference to the illustrated figures.

The processors may execute instructions or "code" stored in any one of memories. The memories may store data as well. Instructions and data can also be transmitted or received over a network via a network interface device utilizing any one of a number of well-known transfer protocols.

Memories may be integrated together with the processing device, for example RAM or FLASH memory disposed within an integrated circuit microprocessor or the like. In other examples, the memory may comprise an independent device, such as an external disk drive, storage array, or any other storage devices used in database systems. The memory and processing devices may be operatively coupled together, or in communication with each other, for example by an I/O port, network connection, etc. such that the processing device may read a file stored on the memory.

Some memory may be "read only" by design (ROM) by virtue of permission settings, or not. Other examples of memory may include, but may be not limited to, WORM, EPROM, EEPROM, FLASH, etc. which may be implemented in solid state semiconductor devices. Other memories may comprise moving parts, such as a conventional rotating disk drive. All such memories may be "machine-readable" in that they may be readable by a processing device.

"Computer-readable storage medium" (or alternatively, "machine-readable storage medium") may include all of the foregoing types of memory, as well as new technologies that may arise in the future, as long as they may be capable of storing digital information in the nature of a computer program or other data, at least temporarily, in such a manner that the stored information may be "read" by an appropriate processing device. The term "computer-readable" may not be limited to the historical usage of "computer" to imply a complete mainframe, mini-computer, desktop, wireless device, or even a laptop computer. Rather, "computer-readable" may comprise storage medium that may be readable by a processor, processing device, or any computing system. Such media may be any available media that may be locally and/or remotely accessible by a computer or processor, and may include volatile and non-volatile media, and removable and non-removable media.

Computing devices used in the control system can further include a video display, such as a liquid crystal display (LCD) or a cathode ray tube (CRT) and a user interface, such as a keyboard, mouse, touch screen, etc. All of the components of the computing device may be connected together via a bus and/or network.

The control system described above can use dedicated processor systems, micro controllers, programmable logic devices, or microprocessors that perform some or all of the operations. Some of the operations described above may be implemented in software, such as computer readable instructions contained on a storage media, or the same or other operations may be implemented in hardware.

For the sake of convenience, the operations are described as various interconnected functional blocks or distinct software modules. This is not necessary, however, and there may be cases where these functional blocks or modules are equivalently aggregated into a single logic device, program or operation with unclear boundaries. In any event, the functional blocks and software modules or features of the flexible interface can be implemented by themselves, or in combination with other operations in either hardware or software.

References above have been made in detail to preferred embodiment. Examples of the preferred embodiments were illustrated in the referenced drawings. While preferred embodiments where described, it should be understood that this is not intended to limit the invention to one preferred embodiment. To the contrary, it is intended to cover alternatives, modifications, and equivalents as may be included within the spirit and scope of the invention as defined by the appended claims.

Having described and illustrated the principles of the invention in a preferred embodiment thereof, it should be apparent that the invention may be modified in arrangement and detail without departing from such principles. Claim is made to all modifications and variation coming within the spirit and scope of the following claims.

The invention claimed is:

1. A control system for controlling a walking apparatus to move a load in a commanded travel direction, the control system comprising:
   a computer configured to:
      store a reset height;
      store a moving height;
      perform reset operations that move support feet of the walking apparatus vertically and away from a base surface to the stored reset height and move the support feet horizontally while raised above the base surface;
      perform moving operations that move the load vertically and away from the base surface to the stored moving height and move the load horizontally in the commanded travel direction while raised above the base surface; and
      repeat the reset operations at the stored reset height and repeat the moving operations at the stored moving height.

2. The control system of claim 1, wherein the processor is further configured to:
   receive a new reset height during the reset operations or receive a new moving height during the moving operations; and
   use the new reset height during subsequent reset operations or use the new moving height during subsequent moving operations.

3. The control system of claim 2, wherein the processor is further configured to:
   identify a minimum reset height to raise the support feet above the base surface during the reset operations; and default to at least the minimum reset height to raise the support feet during the reset operations when the new reset height is less than the minimum reset height.

4. The control system of claim 2, wherein the processor is further configured to:
identify a minimum moving height to raise the load above the base surface during the moving operations; and
automatically raise the load to at least the minimum moving height above the base surface during moving operations when the new moving height is less than the minimum moving height.

5. The control system of claim 1, wherein the processor is further configured to:
identify a minimum reset height to raise the support feet above the base surface during the reset operations;
identify a minimum moving height to raise the load above the base surface during the moving operations;
receive a new height for vertically displacing the support feet;
using the minimum reset height in the reset operations when the new height is between the minimum reset height and the minimum moving height and the new height lifts the support feet off of the base surface; and
using the minimum moving height when the new height is between the minimum reset height and the minimum moving height and the new height lifts the load off of the base surface.

6. The control system of claim 1, wherein the processor is further configured to:
automatically repeat the reset operations at the reset height and automatically repeat the moving operations at the moving height in response to receiving a walking signal from a remote control device;
stop the reset and moving operations when the walking signal is no longer received from the remote control device;
raise the support feet and lower the load back onto the base surface;
reposition the support feet based on a steering signal received from the remote control device; and
restart and automatically repeat the reset operations at the stored reset height and automatically repeat the moving operations at the stored moving height in response to receiving the walking signal from the remote control device.

7. The control system of claim 1, wherein the walking apparatus includes:
lifting devices to raise and lower the support feet; and
displacement sensors configured to identify an amount of vertical displacement of the lifting devices, wherein the processor is configured to identify how far the support feet and load are raised above the base surface based on the amount of vertical displacement of the lifting devices.

8. The control system of claim 7, wherein the processor is further configured to:
receive an adjustment signal changing the amount of vertical displacement of the lifting devices;
store the amount of vertical displacement in memory as a new reset height of the support feet above the base surface or as a new moving height of the load above the base surface; and
use the reset height in the reset operations or use the new moving height in the moving operations.

9. An apparatus, comprising:
a memory storing a computer program for controlling stepping operations for a walking apparatus to move a load bearing frame in a commanded travel direction, the computer program comprising a set of instructions operable to:
perform reset operations that move support feet of the walking apparatus vertically and away from a base surface and move the support feet horizontally while raised above the base surface;
perform moving operations that lower the support feet to move the load bearing frame vertically away from the base surface, and move the load bearing frame horizontally in the commanded travel direction while raised above the base surface;
repeat the reset operations and the moving operations in response to receiving a walking signal from a remote control device;
stop the reset and moving operations, raise the support feet, and lower the load bearing frame back onto the base surface when the walking signal is no longer received;
adjust the walking apparatus to steer the load bearing frame in a different direction based on a steering signal received from the remote control device; and
restart and repeat the reset operations and the moving operations in response to receiving the walking signal from the remote control device.

10. The computer program of claim 9, wherein the set of instructions are further operable to:
receive a height adjustment from the remote control device that changes at least one of an amount the support feet are raised above the base surface during the reset operations or an amount the load bearing frame raises above the base surface during the moving operations;
store the height adjustment; and
use the height adjustment in subsequent reset or moving operations.

11. The computer program of claim 10, wherein the set of instructions are further operable to:
identify a minimum reset height to raise the support feet above the base surface during the reset operations; and
default to at least the minimum reset height to raise the support feet above the base surface during the reset operations when the height adjustment is less than the minimum reset height.

12. The computer program of claim 10, wherein the set of instructions are further operable to:
identify a minimum moving height to raise the load bearing frame above the base surface during the moving operations; and
default to at least the minimum moving height to raise the load bearing frame above the base surface during the moving operations when the height adjustment is less than the minimum moving height.

* * * * *